(12) United States Patent
Levey et al.

(10) Patent No.: US 9,121,430 B2
(45) Date of Patent: Sep. 1, 2015

(54) WAVE THREAD FORM

(75) Inventors: Kenneth K. Levey, West Chicago, IL (US); Philip C. Johnson, Naperville, IL (US); Jeffrey L. Trzaskus, Evanston, IL (US)

(73) Assignee: Illinois Tool Works Inc., Glenview, IL (US)

( * ) Notice: Subject to any disclaimer, the term of this patent is extended or adjusted under 35 U.S.C. 154(b) by 278 days.

(21) Appl. No.: 13/580,768

(22) PCT Filed: Feb. 25, 2011

(86) PCT No.: PCT/US2011/026170
§ 371 (c)(1),
(2), (4) Date: Aug. 23, 2012

(87) PCT Pub. No.: WO2011/106596
PCT Pub. Date: Sep. 1, 2011

(65) Prior Publication Data
US 2012/0315110 A1    Dec. 13, 2012

Related U.S. Application Data

(60) Provisional application No. 61/308,703, filed on Feb. 26, 2010.

(51) Int. Cl.
| F16B 35/04 | (2006.01) |
| F16B 25/00 | (2006.01) |
| F16B 31/04 | (2006.01) |
| F16B 33/02 | (2006.01) |
| F16B 39/30 | (2006.01) |

(52) U.S. Cl.
CPC ............... *F16B 31/04* (2013.01); *F16B 33/02* (2013.01); *F16B 39/30* (2013.01)

(58) Field of Classification Search
CPC .......... F16B 31/04; F16B 33/02; F16B 39/30; F16B 25/00; F16B 25/0057; F16B 25/0073
USPC ................. 411/308, 411, 412–413, 415, 417
See application file for complete search history.

(56) References Cited

U.S. PATENT DOCUMENTS

| 756,269 | A | * | 4/1904 | McMahon | 411/285 |
| 1,070,247 | A | * | 8/1913 | Haines | 411/259 |
| 2,349,592 | A | * | 5/1944 | Hosking | 411/311 |
| 3,459,250 | A | * | 8/1969 | Tabor | 411/310 |
| 3,481,380 | A | | 12/1969 | Breed | |
| 3,661,194 | A | | 5/1972 | MacFarlane et al. | |

(Continued)

FOREIGN PATENT DOCUMENTS

| GB | 1209225 A | 10/1970 |
| JP | 3031085 | 11/1996 |

OTHER PUBLICATIONS

An International Search Report, dated May 23, 2011, in International Application No. PCT/US2011/026170.

*Primary Examiner* — Roberta Delisle
(74) *Attorney, Agent, or Firm* — Paul F. Donovan

(57) ABSTRACT

A wave thread form for threaded fasteners includes multiple thread pitches along a generally helical path, and includes multiple wave thread portions each deviating from a straight-line helical path, with adjacent wave thread portions along the helical path being separated by standard thread portions extending along the generally straight-line helical path.

20 Claims, 7 Drawing Sheets

(56) References Cited

U.S. PATENT DOCUMENTS

| | | | | |
|---|---|---|---|---|
| 3,721,283 A | * | 3/1973 | Evans | 411/311 |
| 3,885,613 A | * | 5/1975 | Evans | 411/311 |
| 3,927,503 A | * | 12/1975 | Wilson | 411/311 |
| 4,071,067 A | * | 1/1978 | Goldby | 411/307 |
| 5,194,214 A | * | 3/1993 | Snyder et al. | 411/311 |
| 6,464,439 B1 | * | 10/2002 | Janitzki | 411/308 |
| 7,101,133 B2 | | 9/2006 | Dicke | |
| 7,326,014 B2 | | 2/2008 | Levey et al. | |
| 7,484,920 B2 | | 2/2009 | Wieser | |
| 7,963,732 B2 | * | 6/2011 | Stager et al. | 411/310 |
| 8,033,700 B2 | * | 10/2011 | Gattone | |
| 8,845,253 B2 | * | 9/2014 | Stager et al. | 411/308 |
| 2007/0274805 A1 | | 11/2007 | Nebl et al. | |
| 2009/0003969 A1 | * | 1/2009 | Gattone et al. | 411/413 |
| 2009/0092461 A1 | | 4/2009 | Bubulka et al. | |

\* cited by examiner

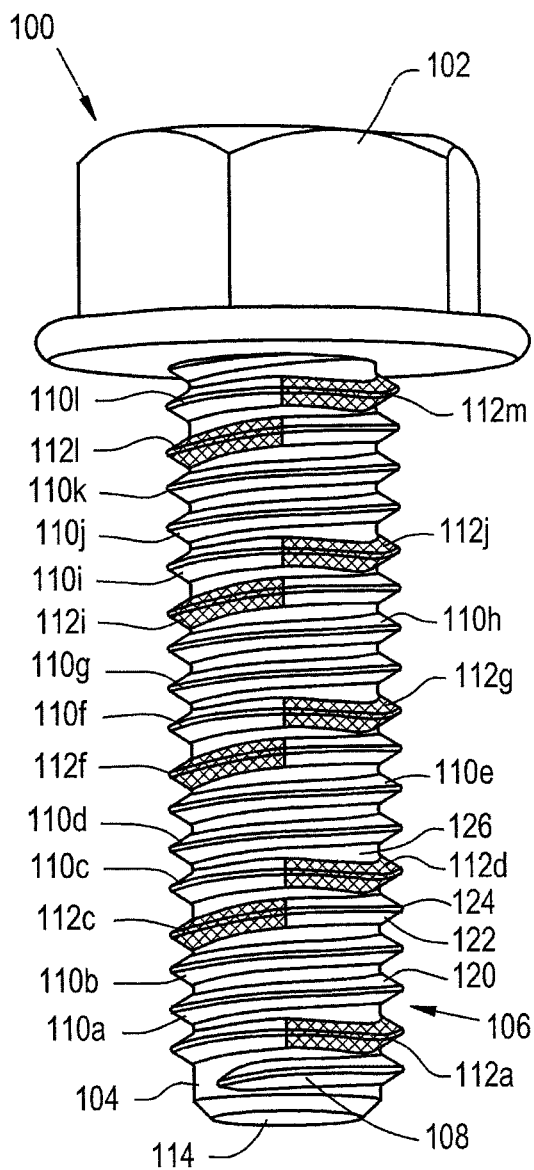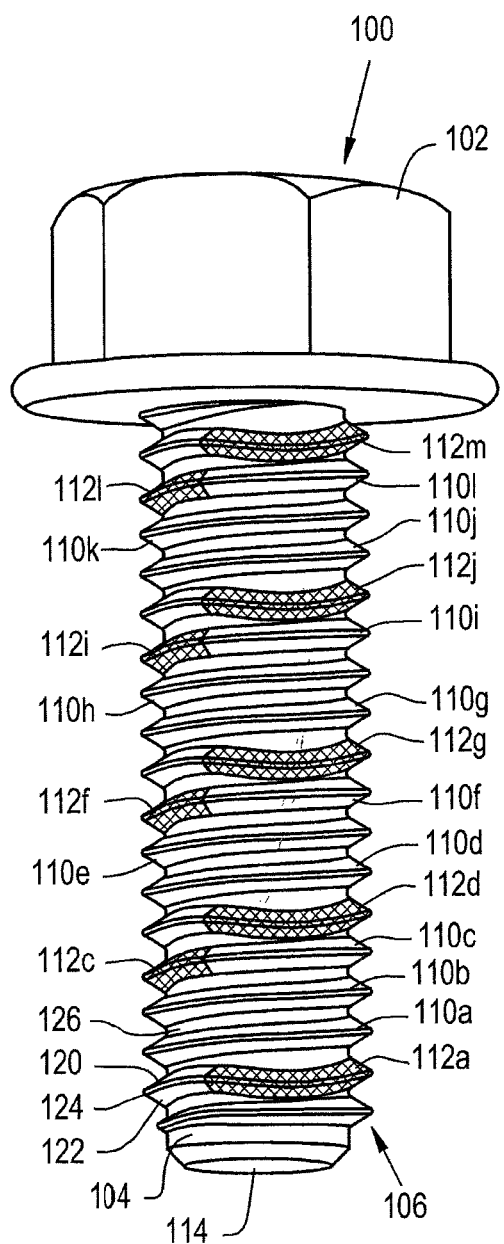
Fig. 1
Fig. 2

WAVE THREAD FORM

CROSS-REFERENCE TO RELATED APPLICATIONS

The present application is based on International Application No. PCT/US2011/026170 filed Feb. 25, 2011 and claims the benefits of U.S. Provisional Application Ser. No. 61/308,703 filed Feb. 26, 2010.

FIELD OF THE INVENTION

The present invention relates generally to threaded fasteners, and, more specifically, the invention relates to thread configurations in threaded fasteners for creating prevailing torque in a threaded assembly.

BACKGROUND OF THE INVENTION

Simple threaded fasteners include a male threaded component and a female threaded component configured to engage one with another. According to the Industrial Fasteners Institute (IFI), a thread is defined as a uniform section in the form of a helix on the external or internal surface of a cylinder. To improve the performance of threaded fasteners for different purposes, a variety of thread configurations are known. In general, threads of all types are based on a straight-line helix pattern. The thread pitch may vary from one type or size of fastener to another, and it is known to provide a differing thread pitch on different portions of the same fastener. However, regardless of the pitch the thread follows a straight-line helical pattern.

In a standard fastener design, for a given or "basic" pitch, the male thread is provided at equal to or less than the basic pitch and the female thread is provided at equal to or more than the basic pitch. The result is that the male thread "floats" within the female thread, allowing the two components to be run together throughout the thread length with little or no interference until clamping pressure is applied during final tightening of the fastener. As the fastener is tightened and clamp load applied, friction is created from stretch in the fastener as it is placed under tension. Clamp load can loosen from vibration, slip of the angular thread surfaces over time, expansion and contraction cycles and the like. It is known to provide prevailing torque by deforming the nut or using paste-like substances in the threads to maintain the relative position of the male and female components, even if clamp load is lost. Crimping a nut adds considerable cost to the manufacturing process, and known paste-like substances for the purpose are somewhat limited in extreme temperature conditions and have limited reusability.

Further difficulties occur when threaded fasteners are used in somewhat non-standard situations. Tightening the fastener requires application of clamp load, meaning the head of the fastener, the confronting surface of the female fastener and all materials or components therebetween are compressed together. In so called "soft joints" such as, for example, joints holding together elastic materials, gaskets or the like, it is desirable that the fastener joint be tight without excessive clamp force applied on the material being held. Shoulder bolts or standard fasteners with spacers have been used for this purpose, complicating assembly and increasing costs.

Threaded fasteners are known to be preassembled in components that are designed to be installed with other components or associated members, and thereafter tightened. For example, various electrical assemblies are provided for use in the field with screws already in place on terminals to receive wires therein. With the wire properly positioned, the screw is tightened to establish electrical connection between the wire and the electrical assembly. The pre-installed position of the screw must be relatively secure so that the screw does not become lost, making the component unusable.

U.S. Pat. No. 7,326,014 discloses an interactive fit screw thread that includes a curved line path thread provided within the helical thread pattern on the shank of a fastener. The curved thread pitch is provided to establish prevailing torque along desired portions of the fastener. Instead of the generally straight-line helical path followed by common fastener threads, the interactive fit screw disclosed in the '014 patent follows a curved-line path in a helical pattern. The exemplary embodiment disclosed in the '014 patent follows a sinusoidal wave path.

To assure aligned attachment with a mating thread, three wave periods covering 360° around the fastener shank are used in the embodiments disclosed in the aforementioned U.S. Pat. No. 7,326,014. Each wave crest is 120° from the previous wave crest, and the waves follow immediately after one another so that the waves are clustered on a single thread pitch. This works effectively; however, to achieve the advantages provided from the wave portions of the thread, the fastener is position dependent. In a threaded assembly, it is necessary to have the wave thread portion properly located with respect to the mating thread to ensure proper engagement and alignment of three waves. For example, it is common to provide four internal thread pitches in a female fastener component. To work most effectively, three waves of the male fastener component should be located in engagement with the threads of the female component. If the male fastener component is over rotated or under rotated relative to the female fastener component, so that less than three waves are engaged with the female component, the threaded assembly can be less effective. Accordingly, it has been necessary to have a coordinated knowledge of the final fastener component relationships so that the waves can be positioned appropriately for finally engagement in the female threaded component.

It is desirable to provide a threaded fastener having an interactive fit screw thread that is not position dependent and that provides prevailing torque along an elongated portion of the thread length.

SUMMARY OF THE INVENTION

The wave thread form described herein provides fasteners with built in prevailing torque, the advantages of which can be experienced with random positioning of the fastener in a fastener assembly, by including both wave thread portions and standard thread portions along a generally helical thread. In a preferred form, each wave thread portion extends less than a full thread pitch and is separated from adjacent wave thread portions by a standard thread portion extending for a full thread pitch.

In one aspect of an embodiment thereof, a thread form for a threaded fastener having a thread extending along a generally helical path for multiple thread pitches is provided with multiple wave thread portions each defining a thread segment in which the thread deviates from a straight line helical path. A standard thread portion is provided between adjacent wave thread portions, each standard thread portion defining a thread segment extending along the generally straight line helical path.

In one aspect of an embodiment thereof, a threaded fastener is provided with a shank and a thread on the shank, the thread defining multiple thread pitches along a generally helical path. The thread includes multiple wave thread portions each defining a thread segment in which the thread deviates from the straight line helical path, and a standard thread portion between adjacent wave thread portions, each standard thread portion defining a thread segment extending along the generally straight line helical path.

An advantage of one embodiment of a wave thread form as described herein is providing a fastener with built-in prevailing torque along an extended length of the fastener, with which the advantages of prevailing torque can be realized with random positioning of the threaded fastener in a threaded assembly.

Another advantage of an embodiment of a wave thread form as described herein is providing a fastener with built in that can be used efficiently in soft joints.

Still another advantage provided by at least some embodiments of wave thread forms as described herein is providing threaded fasteners with built in prevailing torque that can be used for fasteners with fine thread configurations, fasteners of small diameter and/or fastener assemblies in which at least one threaded component is made of relatively soft material.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a perspective view of a threaded fastener having a wave thread form as disclosed herein;

FIG. 2 is a perspective view of the threaded fastener rotated 30° in a right-hand, or clockwise direction from the position shown in FIG. 1;

Figure 3:
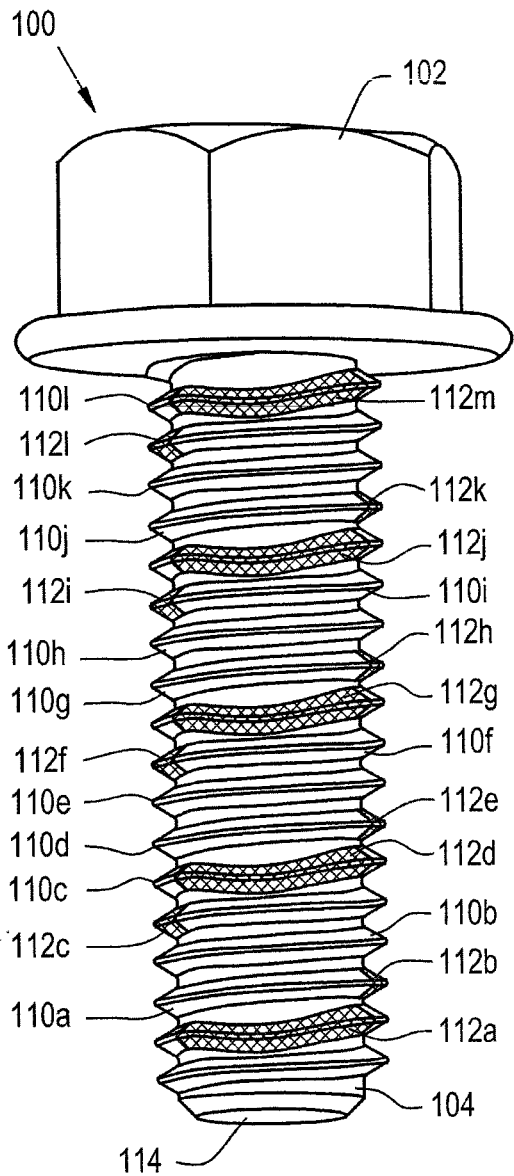
FIG. 3 is a perspective view of the threaded fastener rotated 30° in a right-hand, or clockwise direction from the position shown in FIG. 2.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 100 designates a threaded fastener, and more specifically a bolt having a head 102, a shank 104 and a continuous helical thread 106 having a wave thread form. Helical thread 106 extends along a generally helical path on shank 104 and defines multiple thread pitches, each thread pitch being a helical distance of one full rotation on shank 104. Helical thread 106 includes a lead-in thread portion 108 and both standard thread portions 110 and wave thread portions 112, as will be described in more detail hereinafter. Each wave thread portion 112 of the exemplary embodiment shown extends less than a full thread pitch and defines a thread segment in which the thread deviates from a straight line helical path. Each standard thread segment 110 of the exemplary embodiment shown extends for one full thread pitch and defines a thread segment extending along the generally straight line helical path. In the exemplary embodiment shown, fastener 100 includes a blunt end or tip 114 on the end of shank 104 opposite head 102, but those skilled in the art will understand that a tapered end or tip also could be provided.

As shown in FIG. 1, thread 106 includes a pressure flank 120 and a trailing flank 122 from a thread crest 124 to a thread root 126. Thread 106 is disposed in a generally helical pattern along shank 104, and may extend substantially full length of fastener 100, or may begin or end some distance spaced from ends of the fastener.

Figure 4:
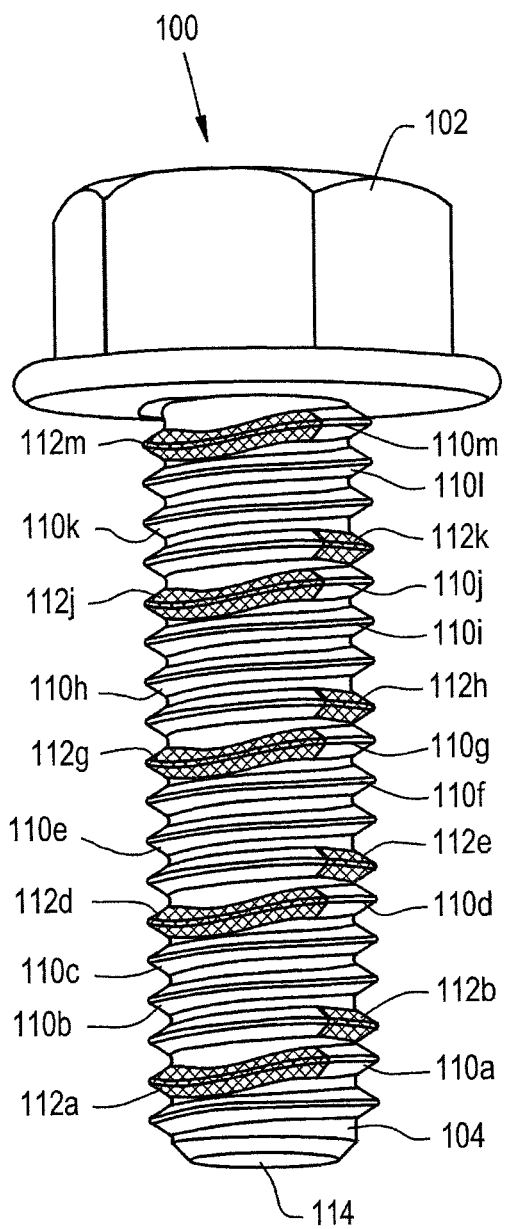
FIG. 4 is a perspective view of the threaded fastener rotated 30° in a right-hand, or clockwise direction from the position shown in FIG. 3.
Figure 5:
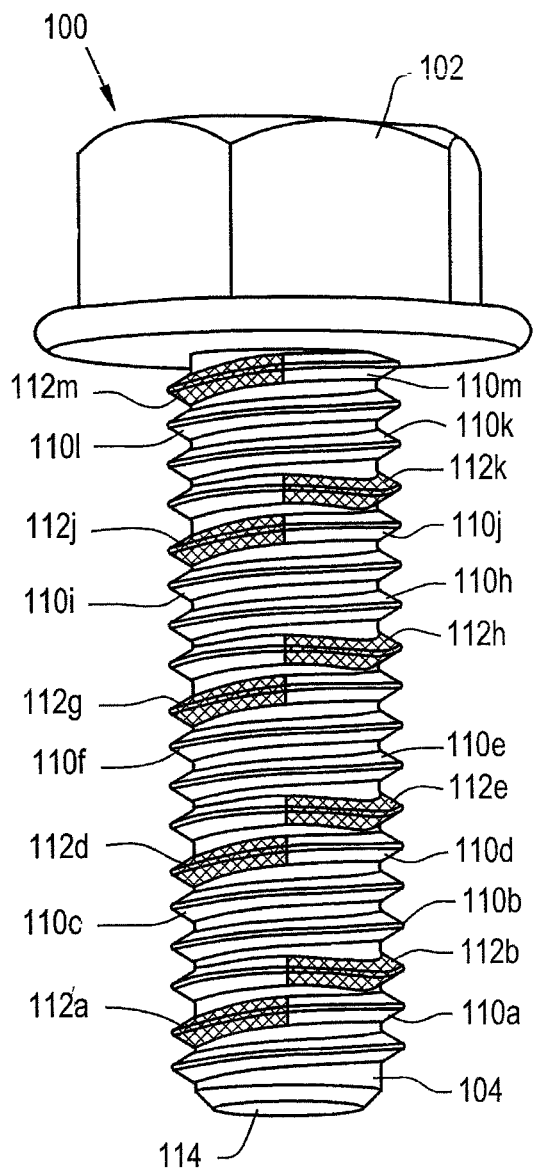
FIG. 5 is a perspective view of the threaded fastener rotated 30° in a right-hand, or clockwise direction from the position shown in FIG. 4.
Figure 6:
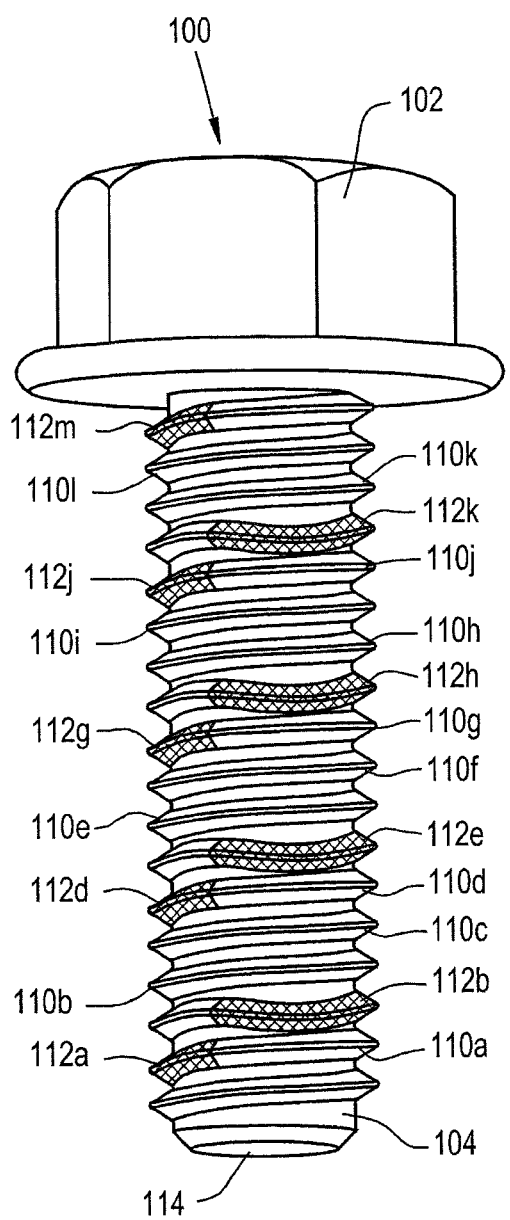
FIG. 6 is a perspective view of the threaded fastener rotated 30° in a right-hand, or clockwise direction from the position shown in FIG. 5.
Figure 7:
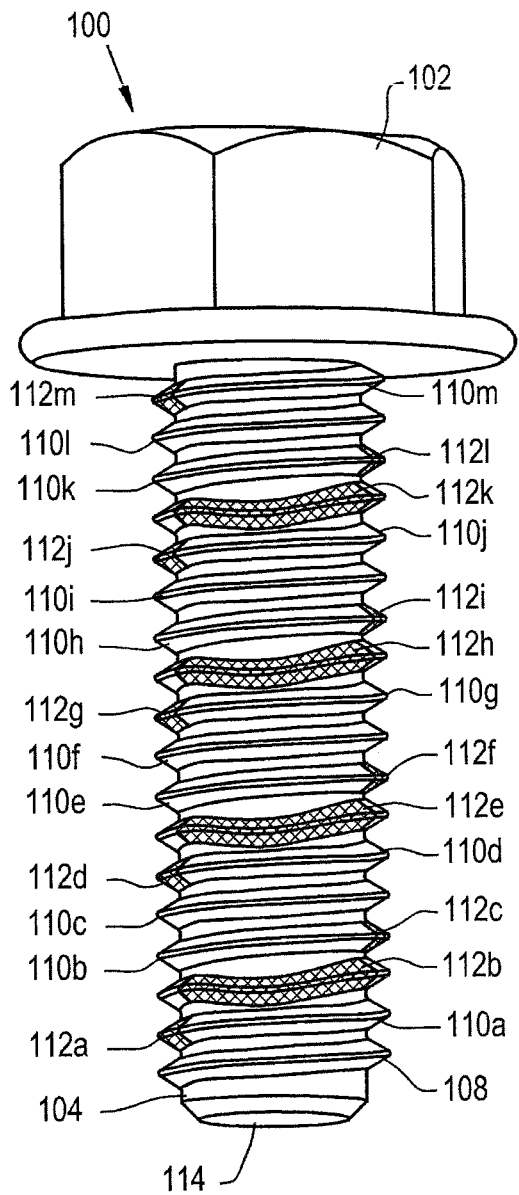
FIG. 7 is a perspective view of the threaded fastener rotated 30° in a right-hand, or clockwise direction from the position shown in FIG. 6.
Figure 8:
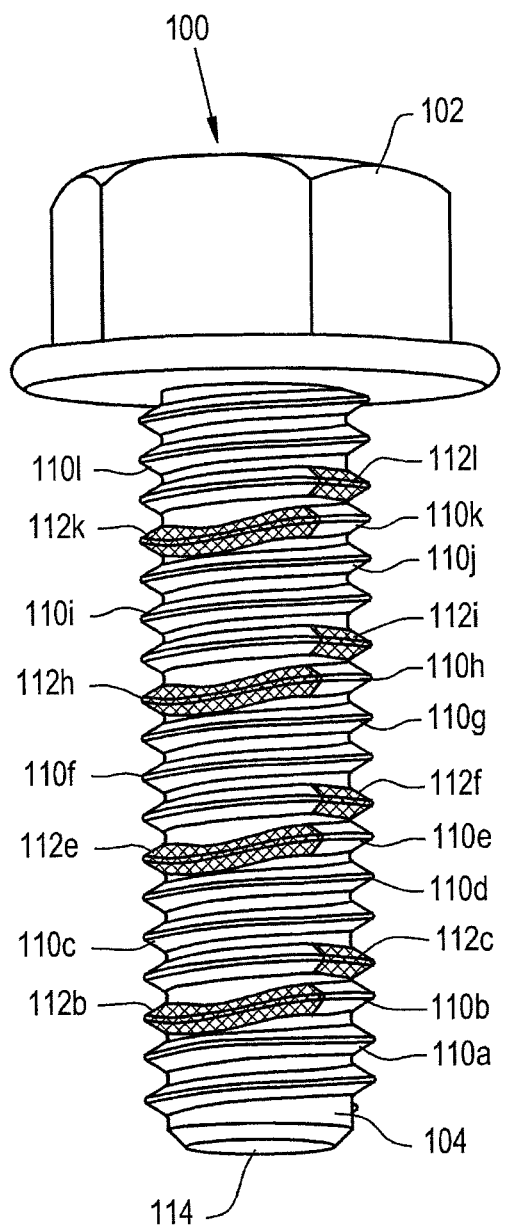
FIG. 8 is a perspective view of the threaded fastener rotated 30° in a right-hand, or clockwise direction from the position shown in FIG. 7.
Figure 9:
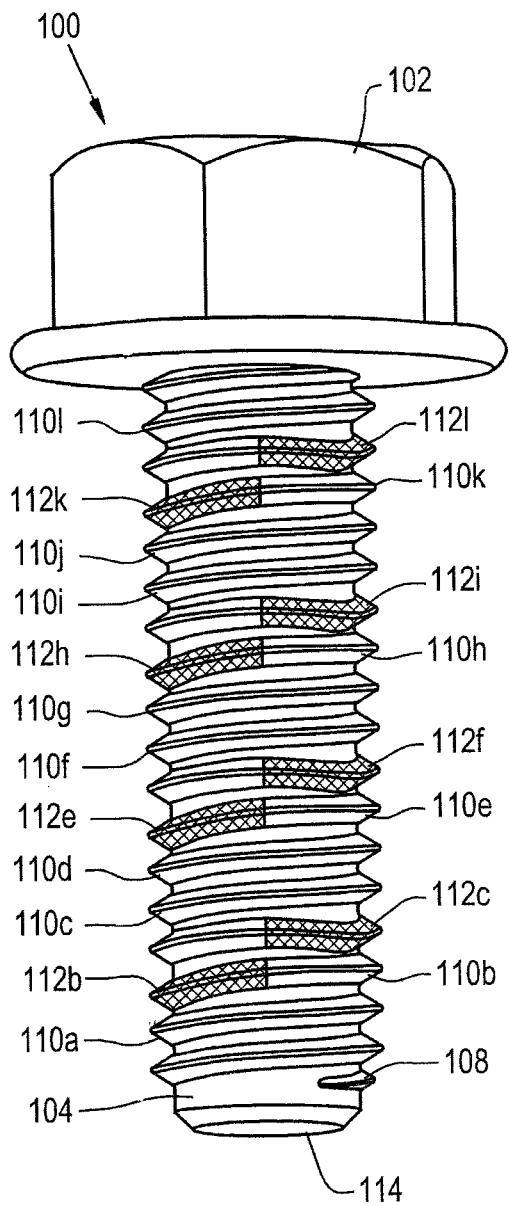
FIG. 9 is a perspective view of the threaded fastener rotated 30° in a right-hand, or clockwise direction from the position shown in FIG. 8.
Figure 10:
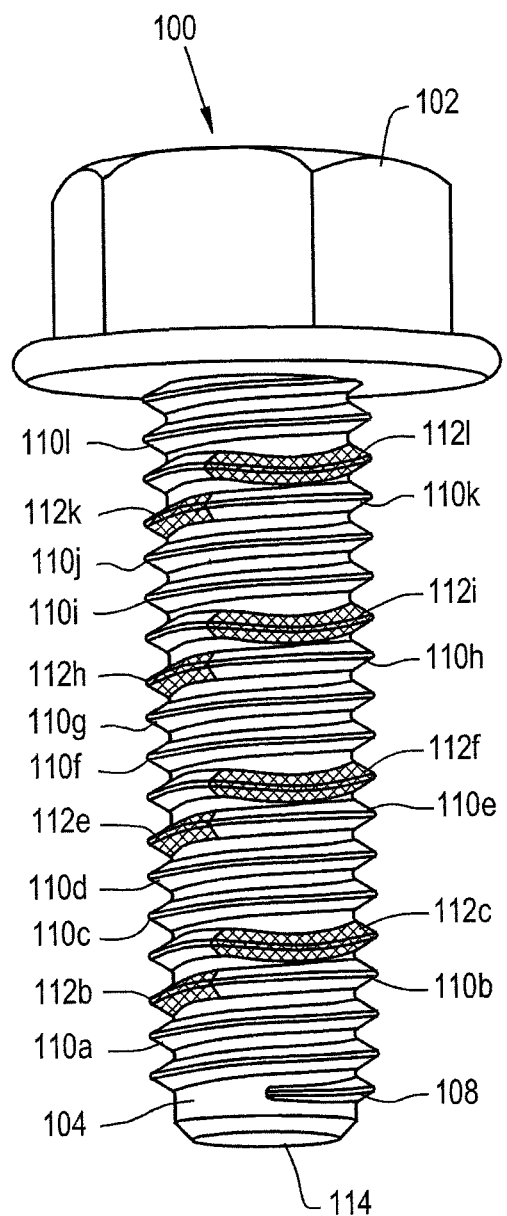
FIG. 10 is a perspective view of the threaded fastener rotated 30° in a right-hand, or clockwise direction from the position shown in FIG. 9.
Figure 11:
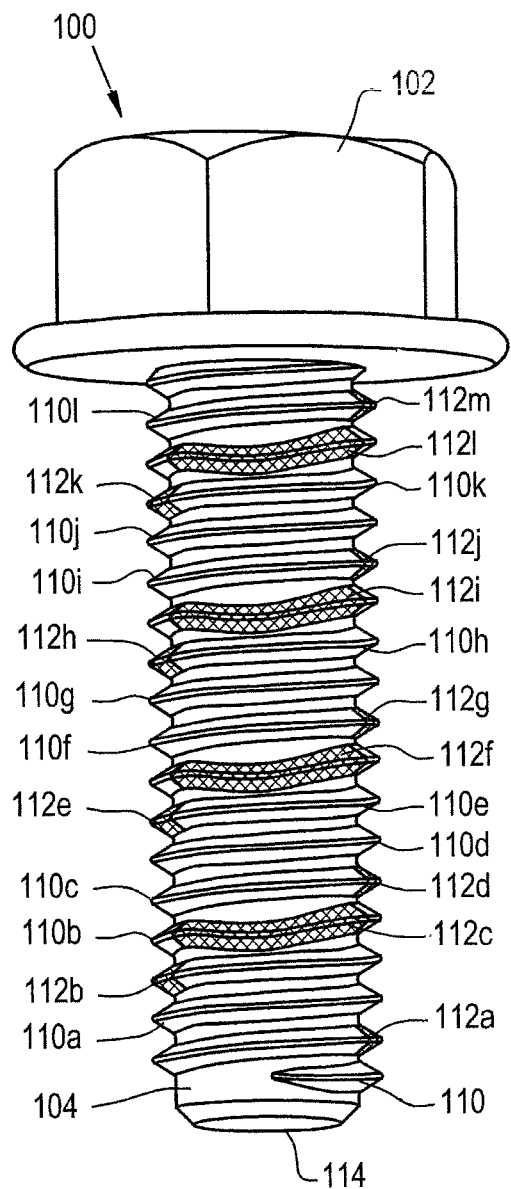
FIG. 11 is a perspective view of the threaded fastener rotated 30° in a right-hand, or clockwise direction from the position shown in FIG. 10.
Figure 12:
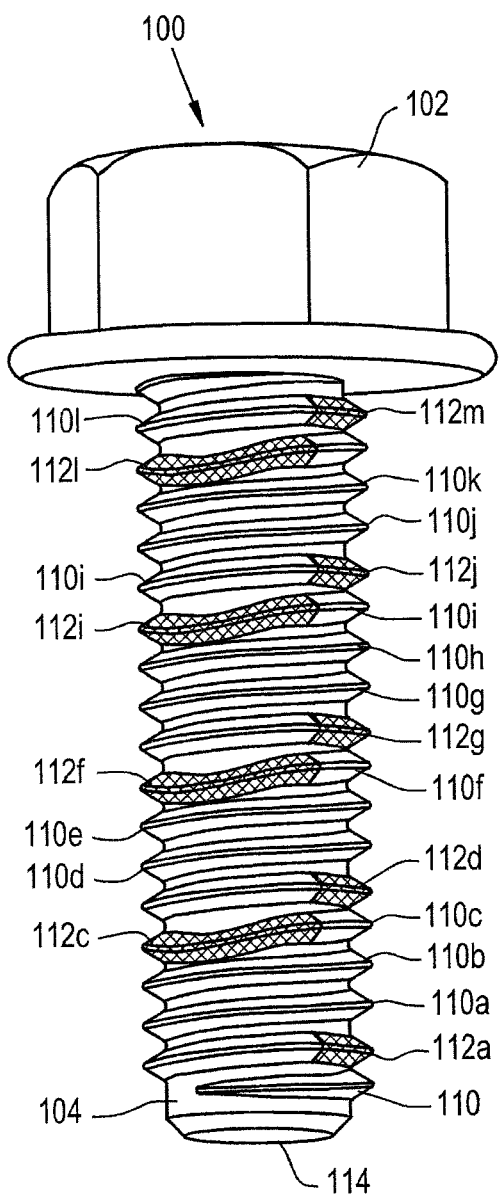
FIG. 12 is a perspective view of the threaded fastener rotated 30° in a right-hand, or clockwise direction from the position shown in FIG. 11.

FIGS. 2-12 depict fastener 100 rotated 30° from the view of the immediately preceding Fig. Accordingly, FIG. 2 depicts fastener 100 rotated 30° from the view of FIG. 1; FIG. 3 depicts fastener 100 rotated 30° from the view of FIG. 2 (and therefore 60° from the view of FIG. 1); FIG. 4 depicts fastener 100 rotated 30° from the view of FIG. 3 (and therefore 60° from the view of FIG. 2 and 90° from the view of FIG. 1); and so forth for the remaining FIGS. 5-12. Thus, it should also be noted that FIG. 1 depicts fastener 100 rotated 30° from the view shown in FIG. 12.

It should be understood that the specific fastener shown in the drawings is merely exemplary, and the wave thread form disclosed herein can be used on various types of fasteners including those having only limited threaded portions on extended length shanks, screw-type fasteners and threaded fasteners of other types. In the exemplary embodiment illustrated, head 102 is a six-sided shape configured for engagement by a wrench. Those skilled in the art will readily understand that head 102 can be otherwise configured than with a hexagonal shape. Thus, head 102 can be configured with a slot or cavity for receiving a screwdriver, torx driver, or driver of other type. Further, the outer periphery of head 102 can be configured to engage drivers other than those for hex shapes.

The wave thread form hereof uses individual waves which extend less than a full thread pitch, and in the exemplary embodiment for a distance of about ⅓ of a thread pitch (thus, 120° around shank 104), with each individual wave thread portion being separated from adjacent wave thread portions by a standard thread portion that extends for a distance of about one full thread pitch (thus, for 360° around shank 104). Accordingly, the wave thread portions are divided over multiple thread pitches and can extend in the pattern described for the full length of thread 104, or for some portion less than the full length of the thread, with a standard thread configuration at the beginning of the thread, at the end of the thread, or both.

In the exemplary embodiment, the individual wave thread portions are identified in consecutive manner by letters "a" through "m" along with the reference number 112. Accordingly beginning from lead-in thread portion 108, the first wave thread portion is designated as 112a, the next wave thread portion as 112b, and so forth. Similar designations have been applied to the standard thread portions 110 between the various wave thread portions 112a through 112m. A first standard thread portion between wave thread portion 112a and 112b has been identified as standard thread portion 110a, a second standard thread portion between wave thread portions 112b and 112c has been designated as standard thread portion 110b, and so forth along the length of fastener 100.

Each wave thread portion 112a through 112m defines a thread segment that extends for one-third of a thread pitch and is separated from adjacent wave thread portions by a standard thread portion 110 that extends for a full thread pitch. Accordingly, the wave crests of adjacent wave thread portions 112a through 112m are separated by 1⅓ thread pitch. Spreading the waves widens the stance of the fastener, creating a more stable and smooth interaction with the internal thread of a complementary female fastener component that will receive fastener 100. The prevailing torque benefits provided by wave threads are realized without the need to place the waves at exact points on the fastener, and without the need to position one of the fastener components within the other of the fastener components at a specific relative position. Placing the waves on the external thread in the manner illustrated and described for the exemplary embodiment can perform effectively if any three pitches along the length of the fastener are engaged in the mating threaded structure. This allows the start of the thread to occur anywhere, without special consideration for the tooling and fastener with respect to the final assembly. So long as any three thread pitches are engaged, the appropriate number of wave thread portions will be involved in the final threaded assembly to achieve the full benefits of the prevailing torque provided from wave thread portions 112.

The pattern of the standard thread portions and wave thread portions on the helical thread now will be described more specifically with respect to FIGS. 1-12. A first wave thread portion 112a may be preceded by a standard or lead in thread portion 108 of a suitable length, and the first wave thread portion 112a extends for ⅓ thread pitch or a distance of approximately 120° around shank 104. A standard helical thread portion 110a continues from first wave thread portion 112a and extends for a distance of one complete helix, 360° around shank 104 from the end of first wave thread portion 112a. Thereafter a second wave thread portion 112b is provided extending for approximately a distance of ⅓ thread pitch (120° around shank 104), followed again by a standard thread portion 110b for a complete thread pitch, extending 360° around shank 104. Thereafter a third wave thread portion 112c extends for a length covering approximately 120° around the shank. This pattern of wave thread portions extending approximately 120° around shank 104 (⅓ thread pitch) followed by a standard thread portion extending approximately 360° around the shank 104 (one full thread pitch) continues from the lead end tip of the fastener throughout the length of the thread.

The locations of the first, second and third wave thread portions can be appreciated from comparing the series of depictions of the fastener rotated by 30° increments from FIG. 1 through FIG. 12. In FIG. 1, the first wave thread portion 112a and the third wave thread portion 112c are visible, while the second wave thread portion 112b is not visible. When the fastener is rotated 30° to the view of FIG. 2, less of the third wave thread portion 112c is visible, and more of the first wave thread portion 112a is visible. When the fastener is rotated an additional 30° to the view of FIG. 3, the second wave thread portion 112b enters into the view. With an additional 30° rotation, as shown in FIG. 4, the third wave thread portion 112c has been rotated out of view, and more of the second wave thread portion 112b can be seen. The first wave thread portion 112a remains visible. The continued progression can be seen throughout further rotations of the fastener from FIG. 5 through FIG. 12. The relative positions of the other wave thread portions 112d-112m can also be appreciated from FIGS. 1-12.

Thread 106 remains the same in cross-sectional shape throughout the standard thread portions 110 and the wave thread portions 112. Throughout the helical pattern, the cross-sectional shape remains the same. However, the entire thread from root 126 to crest 124 follows a curved path along the wave thread portions 112. In the exemplary embodiment shown, wave thread portions 112 deviate from the straight line path in the direction away from head 102 and toward tip 114; however, fasteners can be provided in which wave thread portions deviate from a straight-line path toward the head of the fastener and away from the tip of the fastener, or deviate from the straight-line path in both directions.

In the exemplary embodiment shown, wave thread portions 112 each define a single wave extending ⅓ of a thread pitch; however, it should be understood that wave thread portions having more than a single wave can be used, and/or wave thread portions can extend for distances more or less than ⅓ of a full thread pitch. Further, while the exemplary embodiment has been shown and described to include standard thread portions 110 between adjacent wave thread portions 112 in which the standard thread portions 110 extend for one complete pitch of the thread, adjacent wave thread portions can be separated by standard thread portions extending more or less than a full thread pitch. Thus, the desired cooperative relationship between male and female threads in a threaded assembly can be advantageously designed to take full advantage of the prevailing torque features provided by the wave thread portions when more or less than three thread pitches are engaged in the threaded assembly. Further, the amplitude of each wave in the wave thread portions 112 can be selected to provide the desired prevailing torque characteristics, with higher amplitudes providing greater prevailing torque and lower amplitudes providing lower prevailing torque. Torque requirements can be precisely controlled through selection of amplitude and frequency of the waves in the wave thread portions 112 along with the spacing of the wave thread portions with standard thread portions 110 therebetween.

Figure 13:
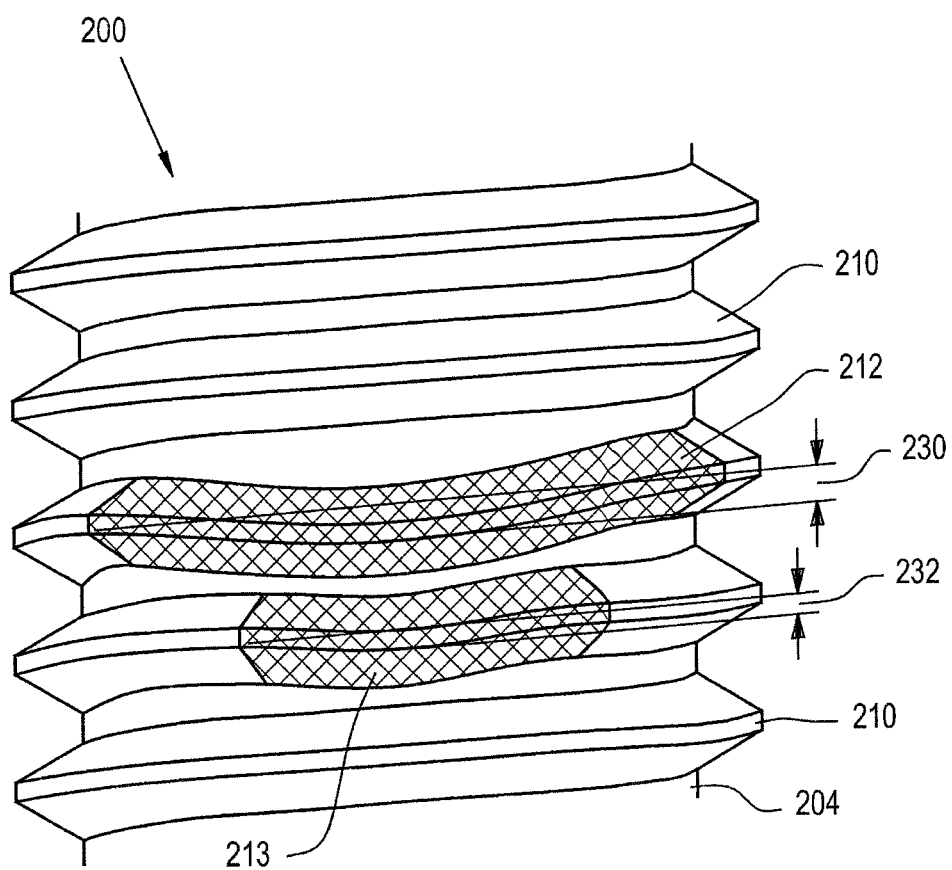
FIG. 13 is an enlarged, fragmentary view of an alternate form of a wave thread form.

Another embodiment of the wave thread form is shown in FIG. 13. Fastener 200 illustrated therein includes a shank 204, standard thread portions 210 and a wave thread portion 212 similar to the wave thread portions 112a-112m described previously herein. Wave thread portion 212 is paired with a nested wave thread portion 213 on the adjacent thread pitch. Wave thread portion 212 has a wave height indicated in FIG.

13 by the dimension designated 230, and nested wave thread portion 213 has a wave height indicated by the dimension designated 232. The nested wave thread portion 213 can have a wave height 232 less than the wave height 230 of its associated wave thread portion 212. Nested wave thread portions 213 having one-half the wave height of the associated wave thread portions 212 have worked effectively. Nested wave thread portion 213 can be generally axially aligned with the associated wave thread portion 212 on fastener shank 204, as shown in FIG. 13, and in the exemplary embodiment deviates from the straight-line helical path in the same direction as the associated wave thread portion 212. In the exemplary embodiment, wave thread portion 212 and nested wave thread portion 213 each deviate from the straight-line helical path any same direction, toward the tip of fastener 200. Use of the nested wave 213 facilitates thread rotation when fine threads are used and/or when one or the other of the threaded fastener components are of softer material, and/or are of small diameter. The nested wave 213 overcomes disadvantages that can result from root interference of the engaging threads under these and other conditions. The nested wave does not engage the internal thread in a fastened assembly, but provides additional clearance to the internal thread. In softer materials, the nested wave 213 allows material flow created by the full associated size wave portion 212.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A thread form for a threaded fastener having a thread extending along a generally helical path for multiple thread pitches, said thread form comprising:
    multiple wave thread portions each defining a thread segment in which the thread has a cross-sectional shape and deviates from a straight line helical path; and
    a standard thread portion between adjacent wave thread portions, each standard thread portion defining a thread segment having a cross-sectional shape and extending along a straight line helical path, wherein the cross-sectional shape of said wave thread portions is the same as the cross-sectional shape of each standard thread portion.

2. The thread form of claim 1, each wave thread portion extending for a distance less than a full thread pitch.

3. The thread form of claim 1, each standard thread portion extending a distance of at least a full thread pitch.

4. The thread form of claim 1, each wave thread portion extending for a distance of approximately one-third of a thread pitch and defining one complete wave deviating in one direction away from the straight line helical path; and each standard thread portion extending for a distance of approximately 1 full thread pitch.

5. The thread form of claim 4, including at least three said wave thread portions.

6. The thread form of claim 1, each said wave thread portion defining a wave of a first wave height, and said thread including a nested wave thread portion defining a wave of a second wave height less than said first wave height, said nested wave thread portion being on a thread pitch adjacent to one of said wave thread portions and deviating from the straight-line helical path in the same direction as said wave thread portions.

7. The thread form of claim 6, said nested wave thread portion being axially aligned with a wave thread portion on an adjacent thread pitch.

8. A threaded fastener comprising:
    a shank;
    a thread on said shank, said thread defining multiple thread pitches along a generally helical path;
    said thread including multiple wave thread portions each defining a thread segment in which the thread deviates from a straight line helical path; and
    a standard thread portion between adjacent wave thread portions, each standard thread portion defining a thread segment extending along a straight line helical path, wherein said wave thread portions and said standard thread portion have cross-sectional shapes of equal dimensions.

9. The threaded fastener of claim 8, each said wave thread portion extending for a distance less than a full thread pitch.

10. The threaded fastener of claim 9, each said wave thread portion extending for a distance of approximately one-third of a thread pitch.

11. The threaded fastener of claim 10, each said standard thread portion between adjacent wave thread portions extending for a distance of about one complete thread pitch.

12. The threaded fastener of claim 11, each said wave thread portion defining a wave of a first wave height, and said thread including a nested wave thread portion defining a wave of a second wave height less than said first wave height, said nested wave thread portion being on a thread pitch adjacent to one of said wave thread portions and deviating from the straight-line helical path in the same direction as said wave thread portions.

13. The threaded fastener of claim 12, said nested wave thread portion being axially aligned with a wave thread portion on an adjacent thread pitch.

14. The threaded fastener of claim 13, said second wave height being approximately one-half said first wave height.

15. The threaded fastener of claim 8, each said wave thread portion defining a wave of a first wave height, and said thread including a nested wave thread portion defining a wave of a second wave height less than said first wave height, said nested wave thread portion being on a thread pitch adjacent to one of said wave thread portions and deviating from the straight-line helical path in the same direction as said wave thread portions.

16. The threaded fastener of claim 15, said nested wave thread portion being axially aligned with a wave thread portion on an adjacent thread pitch.

17. The threaded fastener of claim 8, further including a head at one end of said shank and a distal tip at an opposite end of said shank, and said wave thread portions each defining a single wave deviating from the straight-line helical path toward said distal tip of said shank.

18. The threaded fastener of claim 17, each said wave thread portion defining a wave of a first wave height, and said thread including a nested wave thread portion defining a wave of a second wave height less than said first wave height, said nested wave thread portion being on a thread pitch adjacent to one of said wave thread portions and a deviating from the straight-line helical path toward said distal tip of said shank.

19. The threaded fastener of claim 18, each said nested wave thread portion being axially aligned with a wave thread portion on an adjacent thread pitch.

20. The threaded fastener of claim 19, said the second wave height being approximately one-half said first wave height.

* * * * *